United States Patent [19]

Honda et al.

[11] Patent Number: 4,533,604

[45] Date of Patent: Aug. 6, 1985

[54] PRESSURE-SENSITIVE AND CONDUCTIVE RUBBER

[75] Inventors: Kazuhiro Honda; Hiroshi Kuramochi, both of Komur Ina, Japan

[73] Assignee: Kokoku Rubber Industrial Company Limited, Japan

[21] Appl. No.: 503,039

[22] Filed: Jun. 10, 1983

[30] Foreign Application Priority Data

Jul. 9, 1982 [JP] Japan .................... 57-118639

[51] Int. Cl.³ .................... H01B 1/06; B32B 27/32
[52] U.S. Cl. .................... 428/521; 252/502; 252/503; 252/510; 252/511; 427/385.5; 427/393.5; 524/571; 524/297
[58] Field of Search ............ 252/511, 510, 512, 502, 252/518, 503, 506; 524/571, 297, 572, 401, 439, 573-575, 495, 496, 483, 484; 427/384, 385.5, 393.5, 430.1; 428/521, 522; 338/114

[56] References Cited

U.S. PATENT DOCUMENTS

| | | | |
|---|---|---|---|
| 3,779,979 | 12/1973 | Tsuchuja .................... | 524/572 |
| 3,956,195 | 5/1976 | Ozmaulovich et al. ............ | 252/511 |
| 4,025,476 | 5/1977 | Miller et al. .................... | 524/572 |
| 4,101,134 | 8/1978 | Dawans .................... | 524/496 |
| 4,116,894 | 9/1978 | Lentz et al. .................... | 252/500 |
| 4,145,317 | 3/1979 | Saclo et al. .................... | 252/518 |
| 4,147,668 | 3/1979 | Chiklis .................... | 252/511 |
| 4,246,217 | 1/1981 | Hottel et al. .................... | 252/511 |
| 4,317,265 | 3/1982 | Chase et al. .................... | 252/511 |
| 4,321,162 | 3/1982 | Guffens et al. .................... | 252/511 |
| 4,382,024 | 5/1983 | Seaman et al. .................... | 252/511 |

*Primary Examiner*—Josephine L. Barr
*Attorney, Agent, or Firm*—Louis E. Marn

[57] ABSTRACT

This invention relates to a pressure-sensitive and conductive rubber, wherein an involatile or volatile liquid organic substance is impregnated with and swelled in a composite conductive rubber obtained by adding a conductive filler such as a carbon black, metallic fine powders or the like thereto, the involatile or volatile liquid organic substance having compatibility with the composite conductive rubber. The involatile or volatile organic substance immersed in the composite conductive rubber is penetrated between adjacent particles of the conductive filler, thereby respective distances between the adjacent particles thereof are widened and a conductivity resistance of energizing route in the composite conductive rubber under a normal condition is increased. When a certain external load is applied to such a rubber material, the respective distances between the adjacent particles of the conductive filler are shortened in proportion to the scale of the load, namely due to a compressed deformation, thereby electrical conductivity can be recovered continuously.

3 Claims, 6 Drawing Figures

PRESSURE-SENSITIVE AND CONDUCTIVE RUBBER

BACKGROUND OF THE INVENTION

This invention relates to a pressure-sensitive and conductive rubber, wherein a liquid organic substance having compatibility is impregnated with an electrically conductive rubber.

There are being produced various kinds of pressure-sensitive and conductive materials formed by mixing a high-molecular elastic material such as rubber, plastic, etc. or a thermoplastic synthetic resin with a conductive filler such as a carbon black, a conductive metal or the like.

Further, there is known a pressure-sensitive material as an anisotropic conductor. It is produced by the step that the particles or powders of a conductive ferromagnetic metal are dispersed in and mixed with such high-molecular elastic material or thermoplastic synthetic resin, subsequently such a mixture is magnetized in a flow condition and the metallic particles are disposed along a magnetic field. Thus, there is produced a pressure-sensitive and conductive material called anisotropic conductor, in which electrical conductivity is given in a certain direction.

However, when adjusting the pressure-electrical resistance property of the pressure-sensitive and conductive material of this kind to a desired range, the inconvenience is that the mixture ratio of the metallic or carbon particles, their particle size or arrangement must be changed. Further, a liquid silicone rubber is normally used so as to meet a desired property and quality, but since its specific gravity is different from that of the conductive metallic or carbon particles to be mixed with the above liquid silicone rubber, a sendimentation phenomenon of the particles arises when crosslinking the rubber due to a difference of the specific gravity, thereby a uniform dispersion of the particles is not obtained.

BRIEF SUMMARY OF THE INVENTION

It is an object of this invention to provide a pressure-sensitive and conductive rubber which is capable of adjusting the pressure-electrical resistance property to a desired range and has a uniform property.

Further, this invention provides the pressure-sensitive and conductive rubber which can be manufactured simply at a lower cost and is suitable for mass-production.

Speaking more specifically about this invention, the conductive rubber obtained by dispersing uniformly the conductive fine particles of carbon black, metal or the like is immersed and swelled in a liquid organic substance having compatibility, thereby the liquid organic substance immersed in the conductive rubber is penetrated between the carbon black or metallic particles and respective distances between adjacent particles are widened. Thus, energizing routes in the conductive rubber are intercepted to increase resistance to conductivity.

When a certain external load is applied to such a rubber material, respective distances between adjacent particles are shortened in proportion to the scale of the load, namely due to a compressed deformation, thereby electrical conductivity can be recovered continuously.

According to another aspect of this invention, it is feasible to use the conductive rubber material with which an involatile liquid organic substance is impregnated. However, when a volatile liquid organic substance is impregnated with the conductive rubber material, a thin membrance comprising a flexible airtight synthetic resin which has incompatibility with the impregnated liquid organic substance is formed in order to prevent from changing the property of the pressure-sensitive and conductive rubber due to volatization of the impregnated liquid organic substance, thereby a pressure-sensitive and conductive rubber having a constantly stabilized property is obtained.

According to a further aspect of this invention, while making use of the specific characteristic that respective distances between the adjacent conductive particles of the aforesaid rubber material are enlarged by the liquid organic substance having compatibility, this invention aims at adjusting optionally the pressure-sensitive and conductive properties by controlling the degree of impregnation based on an immersing time selecting a specified kind of liquid organic substance.

This invention will be further described, by way of examples, with reference to the accompanying drawings, in which:

BRIEF DESCRIPTION OF THE ACCOMPANYING DRAWINGS

PREFERRED EXAMPLES OF THE INVENTION

Preferred examples of this invention will now be described with reference to the accompanying drawings.

EXAMPLE 1

Figure 1:
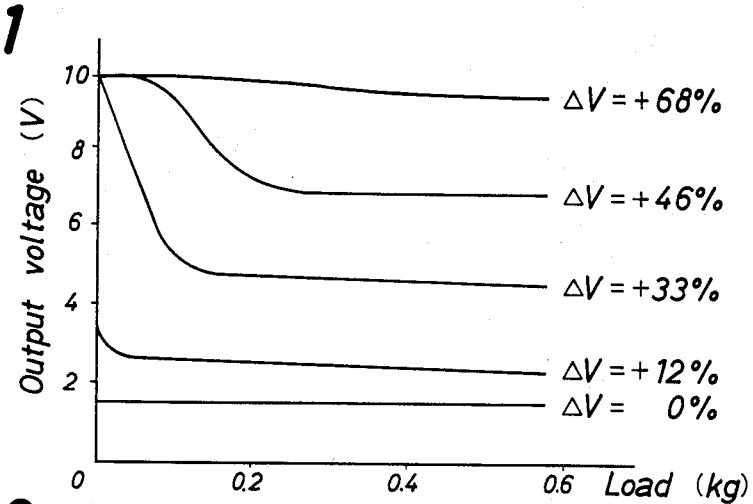
FIG. 1 shows a load-output voltage curve by a swelling degree in Example 1 of a pressure-sensitive and conductive rubber according to this invention.

0.5 weight parts of stearic acid, 7 weight parts of dicumyl peroxide (DCP-40), 30 weight parts of acetylene black and 15 weight parts of Ketjen black were added to and mixed with 100 weight parts of butadiene rubber. A rubber material formed thus was heated and cross-linked for 15 minutes at a temperature of 170° C., thereby a conductive rubber sheet of 0.65 mm, 0.95 mm, 1.45 mm and 3 mm respectively at thickness was obtained. In order to measure the variation of resistance value of the rubber sheet having the thickness 0.95 mm by a difference of a swelling degree, a butadiene rubber was immersed into an involatile naphthenic oil having compatibility for 0 to 48 hours at a room temperature into a butadiene rubber, thereby five kinds of the pressure-sensitive and conductive rubber sheet having the volume variation ratio ($\Delta V$) of 0%, 12%, 33%, 46% and 68% respectively were obtained. Each of those rubber sheets was placed on an electrode and a voltage of 10 V was applied thereto by contacting a smoothened pressing electrode of 0.5 mm at diameter. The variation of output voltage relative to load is shown in FIG. 1. Thus, when the volume variation ratio of the rubber sheet was more than 33%, no power was energized by contacting the pressing electrode simply with a surface of the rubber sheet and insulation was maintained.

Figure 6:
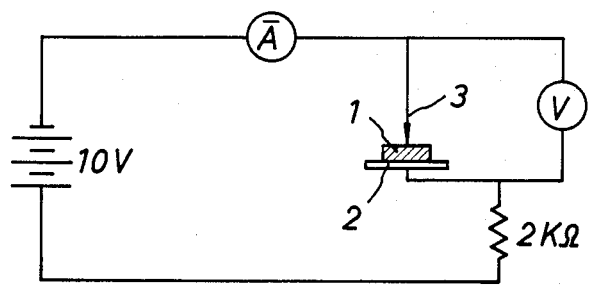
FIG. 6 shows a measuring circuit for measuring a relationship between load and output voltage of the pressure-sensitive and conductive rubber according to this invention.

A circuit for measuring a relationship between the load and the output voltage was shown in FIG. 6, in which numeral 1 is a sample of a rubber sheet, numeral 2: an electrode, numeral 3: a pressing electrode and symbol V: output voltage.

Figure 2:
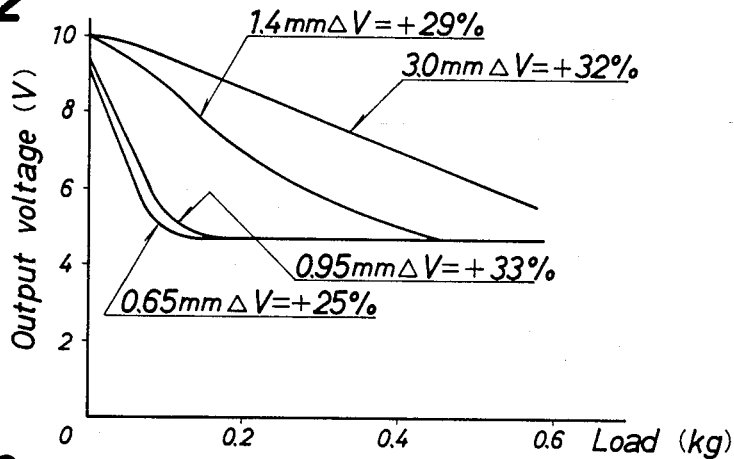
FIG. 2 shows load-output voltage curves by a sheet thickness of the pressure-sensitive and conductive rubber obtained in Example 1.

In FIG. 2 there are shown load-output voltage curves by a sheet thickness. As shown in FIG. 2, as the thickness of the rubber sheet is increased, a reduced inclination of the output voltage becomes small.

Figure 3:
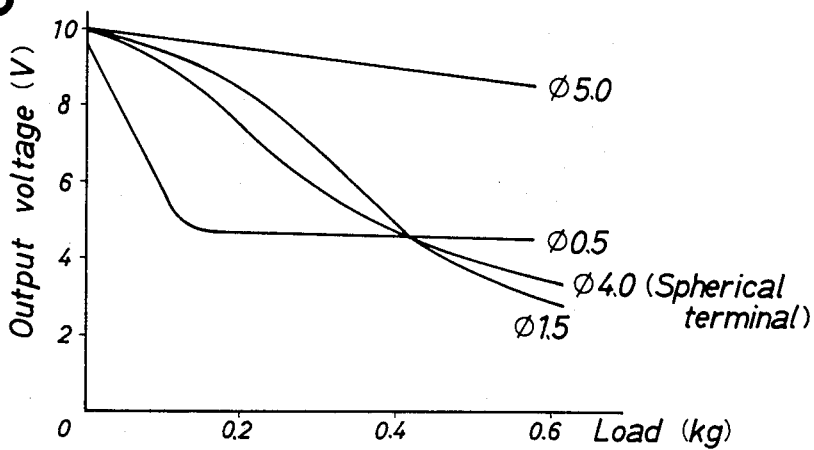
FIG. 3 shows load-output voltage curves based on various terminal surface profiles of a pressing electrode to be used for this invention.

In FIG. 3 there are shown load-output voltage curves by various terminal surface profiles of a pressing electrode to be used for this invention, in which the pressure-sensitive and conductive rubber sheet was 33% at the volume variation ratio and 0.95 mm at thickness. As shown in FIG. 3, as the diameter of the pressing electrode is larger, the inclination of the load-output voltage curve becomes smaller. Further, when there is used a pressing electrode of which terminal surface is spherical, the inclination of the output voltage is curved smoothly.

Figure 4:
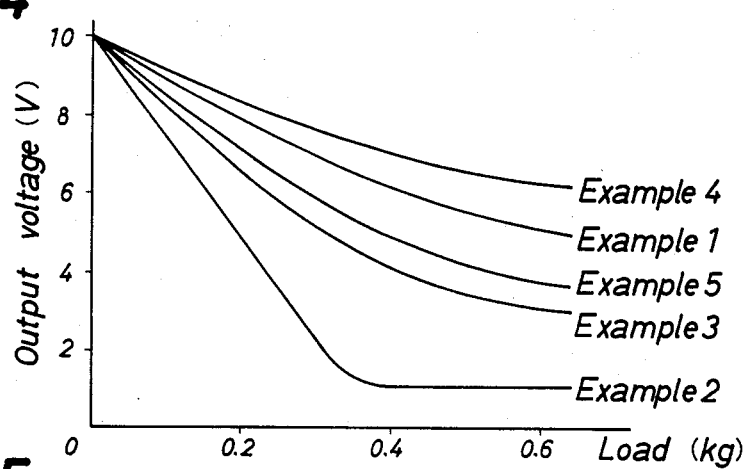
FIG. 4 shows load-output voltage curves in Examples 1, 2, 3, 4 and 5 respectively according to this invention.

In FIG. 4 there are shown load-output voltage curves in Examples 1, 2, 3, 4 and 5, in which the immersion hour of a rubber sheet sample having the thickness 3 mm was 20 hours and its volume variation ratio was 32%. Such a rubber sheet sample was pressed by a pressing electrode of which terminal surface was spherical and 4 mm$\phi$ at diameter.

EXAMPLE 2

0.5 weight parts of stearic acid, 7 weight parts of dicumyl peroxide (DCP-40), 30 weight parts of acetylene black, 10 weight parts of Ketjen black and 100 weight parts of carbonyl nickel were added to and mixed with 100 weight parts of butadiene rubber. A rubber material formed thus was heated and crosslinked for 15 minutes at 170° C., thereby a conductive rubber sheet having the thickness 3 mm was obtained. Then, it was immersed in an involatile naphthenic oil for 20 hours at a room temperature, thereby a pressure-sensitive and conductive rubber sheet having the volume variation ratio 30% was produced. Likewise in Example 1, this sheet was pressed by the same pressing electrode of which terminal surface was spherical and 4 mm$\phi$ at diameter. In FIG. 4 there is shown a load-output voltage curve of Example 2.

EXAMPLE 3

0.5 weight parts of stearic acid, 7 weight parts of dicumyl peroxide (DCP-40), 30 weight parts of acetylene black and 15 weight parts of Ketjen black were added to and mixed with 100 weight parts of nitrile rubber. A rubber material formed thus was heated and crosslinked under the same conditions as Example 2, thereby a conductive rubber sheet having the thickness 3 mm was obtained. Then, it was immersed in a plasticizer dioctyl phtalate for 20 hours at a room temperature, thereby a pressure-sensitive and conductive rubber sheet having the volume variation ratio 30% was produced. Likewise in Examples 1 and 2, this sheet was pressed by the same pressing electrode of which terminal surface was spherical and 4 mm$\phi$ at thickness. In FIG. 4 there is shown a load-output voltage curve of Example 3.

EXAMPLE 4

0.5 weight parts of stearic acid, 7 weight parts of dicumyl peroxide (DCP-40), 30 weight parts of acetylene black and 15 weight parts of Ketjen black were added to and mixed with 100 weight parts of butadiene rubber. A rubber material formed thus was heated and crosslinked for 15 minutes at 170° C., thereby a conductive rubber sheet having the thickness of 3 mm was obtained. Subsequently, it was immersed in an involatile liquid butadiene rubber for 70 hours at a room temperature, thereby a pressure-sensitive and conductive rubber sheet was produced. Likewise in Example 1, this sheet was pressed by the same pressing electrode of which terminal surface was spherical and 4 mm$\phi$ at diameter. In FIG. 4 there is shown a load-output voltage curve of Example 4.

EXAMPLE 5

0.5 weight parts of stearic acid, 7 weight parts of dicumyl peroxide (DCP-40), 30 weight parts of acetylene black and 15 weight parts of Ketjen black were added to and mixed with 100 weight parts of butadiene rubber. A rubber material formed thus was heated and crosslinked for 15 minutes at 170° C., thereby a conductive rubber sheet was obtained. Subsequently, it was immersed in a volatile oil toluene for 10 minutes at a room temperature, thereby a pressure-sensitive and conductive rubber sheet was produced. Two electrodes of 1 mm$\phi$ were mounted on the upper and lower surfaces respectively of the rubber sheet, and an overall surface thereof was thinly coated with a nylon resin of 10 $\mu$m at thickness. Thus, there was obtained a rubber sheet which has prevented volatization of toluene. Likewise in Example 1, this sheet was pressed by loading two electrodes mounted on the upper and lower surfaces. In FIG. 4 there is shown a load-output voltage curve of Example 5.

Figure 5:
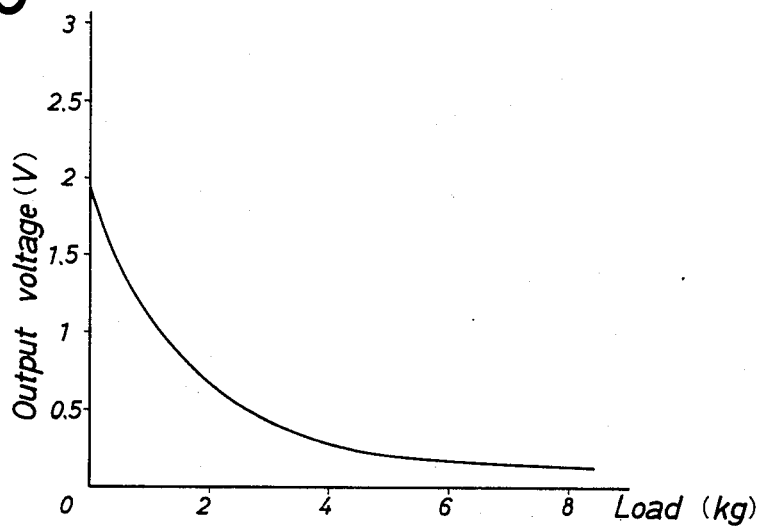
FIG. 5 shows a load-output voltage curve of a metallic thin membrane deposited upon a surface of the pressure-sensitive and conductive rubber according to this invention.

The aforesaid pressure-sensitive and conductive rubber sheet impregnated with toluene and having the volume variation ratio 35% was treated with a normal chemical plating method by changing the position of the electrode, thereby a nickel metal was deposited upon the upper and lower surfaces of the rubber sheet. After that, it was cut into a number of pieces each having the diameter 10 mm and an overall surface of each piece was coated with a nylon resin having the thickness 10 $\mu$m. Subsequently, each piece was pressed by a smoothened pressing electrode of 10 mm at diameter. FIG. 5 shows a load-output voltage curve of the rubber sheet sample obtained at that time.

According to another example, a nickel metal was deposited upon the upper and lower surfaces of the pressure-sensitive and conductive rubber sheet having the thickness 3 mm and the volume variation ratio 33% and it was cut into a number of pieces each having the diameter 10 mm and each piece was pressed by the same smoothened pressing electrode. A load-output voltage obtained at that time was nearly identical with that of FIG. 5.

When the surface of the rubber sheet is coated with the nickel metal, a contact resistance between the surface thereof and the pressing electrode is lesser and it is not influential on resistance of the pressure-sensitive and conductive rubber itself.

The aforesaid chemical plating method conducts a chemical etching by sulfuric acid and chromic acid. Subsequently, a sensitizing process using stannous chloride and an activating process using palladium chloride are carried out, thereby a nickel metal is deposited in a chemical plating bath. The coating method in which a surface of such a rubber sheet is coated with a metallic membrane may be applied not only for the chemical plating method, but also for vacuum metallizing, spattering, ion plating and other known metallizing method.

It should be noted that this invention is not always limited to the aforementioned examples.

As described previously, this invention is characterized in that a liquid organic substance having compatibility is impregnated with a conductive rubber, thereby a resistance to electrical resistance of a rubber material is increased. When a pressure-sensitive and conductive rubber is placed between two electrode opposing thereto, its resistance to conductivity is not high when the electrodes lightly contact it even if a voltage of a few volts is applied to the electrodes, but a certain pressure is applied to the electrodes, the resistance to conductivity is reduced in proportion to the scale of pressure, thereby its conductivity can be recovered.

Accordingly, the pressure-sensitive and conductive rubber of this invention may be applied for pressure sensors, sound control switches and other switches.

Further, a surface of the pressure-sensitive and conductive rubber is coated with a metallic thin membrane, thereby it is possible to remove two opposing electrodes, between which the above rubber is disposed.

What is claimed is:

1. In a pressure-sensitive conductive rubber material including filler particles selected from the group consisting of carbon black particles and metallic particles; an improved pressure-sensitive conductive rubber made of butadiene rubber and an organic liquid selected from the group consisting of naphthenic oil, liquid butadiene rubber and toluene, said organic liquid being compatible with said pressure-sensitive conductive rubber and impregnated into said pressure-sensitive conductive rubber.

2. The improved pressure-sensitive conductive as defined in claim 1 wherein said organic liquid substance is toluene and forms a flexible layer on a surface thereof.

3. In a pressure-sensitive conductive rubber material including filler particles selected from the group consisting of carbon black particles and metallic particles; an improved pressure-sensitive conductive rubber made of nitrile butadiene rubber and dioctyl phthalate, said dioctyl phthalate being an organic liquid compatible with said pressure-sensitive conductive rubber, and impregnated into said pressure-sensitive conductive rubber.

* * * * *